United States Patent [19]
Wheeler

[11] 3,944,492
[45] Mar. 16, 1976

[54] LUBRICANT COMPOSITIONS CONTAINING N-SUBSTITUTED NAPHTHYLAMINES AS ANTIOXIDANTS

[75] Inventor: Edward L. Wheeler, Woodbury, Conn.

[73] Assignee: Uniroyal, Inc., New York, N.Y.

[22] Filed: May 22, 1972

[21] Appl. No.: 255,494

Related U.S. Application Data

[62] Division of Ser. No. 2,382, Jan. 12, 1970, Pat. No. 3,666,716, which is a division of Ser. No. 540,817, April 7, 1966, Pat. No. 3,505,225.

[52] U.S. Cl................................. 252/50; 252/401
[51] Int. Cl.²........................................ C10M 1/32
[58] Field of Search....................................... 252/50

[56] References Cited
UNITED STATES PATENTS

| | | | |
|---|---|---|---|
| 2,530,769 | 11/1950 | Hollis................................ | 252/50 X |
| 2,943,112 | 6/1960 | Popoff et al. .................... | 252/401 X |
| 3,004,916 | 10/1961 | Ertelt................................ | 252/50 X |
| 3,072,603 | 1/1963 | Tholstrup........................ | 260/576 X |
| 3,346,496 | 10/1976 | Neumann et al. ..................... | 252/50 |
| 3,505,225 | 4/1970 | Wheeler........................... | 252/50 X |
| 3,509,214 | 4/1970 | Braid et al. ......................... | 252/50 X |
| 3,573,206 | 3/1971 | Braid et al. ......................... | 252/50 X |
| 3,660,290 | 5/1972 | Schlobohm....................... | 252/50 X |

Primary Examiner—Delbert E. Gantz
Assistant Examiner—Andrew H. Metz
Attorney, Agent, or Firm—Bruce F. Jacobs

[57] ABSTRACT

Derivatives of diphenylamine or phenylnaphthylamine of the types

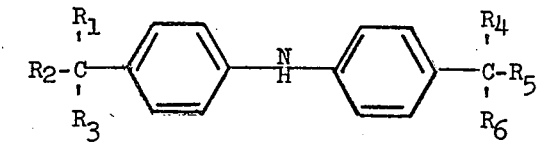

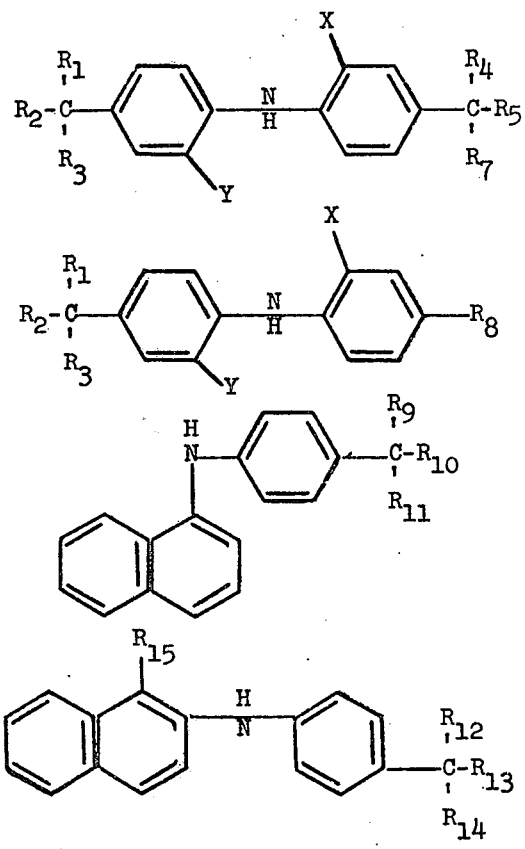

where $R_1$, $R_9$ and $R_{12}$ are phenyl or p-tolyl groups and the remaining R's, X and Y may be alkyl or various other substituents, are useful antioxidants for lubricating oils or for various polymeric substrates (e.g. polypropylene) especially in combination with a dialkyl thiodipropionate. Typical antioxidants are 4,4'-bis-(alpha,alpha-p-trimethylbenzyl)diphenylamine made by reacting p,alpha-dimethylstyrene with diphenylamine, and N-(4-alpha,alpha-dimethylbenzylphenyl)-1-(alpha,alpha dimethylbenzyl)-2-napthylamine made by reacting alpha-methylstyrene with N-phenyl-2-naphthylamine.

4 Claims, No Drawings

LUBRICANT COMPOSITIONS CONTAINING N-SUBSTITUTED NAPHTHYLAMINES AS ANTIOXIDANTS

This application is a division of my copending application Ser. No. 2,382 filed Jan. 12, 1970, now U.S. Pat. No. 3,666,716 which is in turn a division of my application Ser. No. 540, 817, filed April 7, 1966, now U.S. Pat. No. 3,505,225, issued Apr. 7, 1970. The subject matter disclosed herein is also disclosed in my application Ser. No. 787,577, filed Dec. 27, 1968, now U.S. Pat. No. 3,649,690, issued Mar. 14, 1972 which is in turn also a division of my aforesaid application Ser. No. 540,817. The subject matter disclosed herein is also disclosed in my copending applications Ser. No. 163,443, filed July 16, 1971 and now U.S. Pat. No. 3,758,519, 9/11/73 and Ser. No. 164,144, filed July 19, 1971 and now U.S. Pat. No. 3,751,472, 8/7/73, which are divisions of my aforesaid application Ser. No. 787, 577, which is in turn a division of my aforesaid application Ser. No. 540,817.

This invention relates to new antioxidants which are derivatives of diphenylamine and the phenylnaphthylamines, useful either alone, in combination with each other, or in combination with dialkyl 3,3'-thiodipropionates, for the protection of organic materials having relatively low olefinic unsaturation, which are subject to oxidative, deterioration, particularly at elevated temperatures. Examples of materials which are subject to oxidative deterioration at elevated temperatures either in the course of their processing or fulfulling their prescribed function and which are protected by the compounds of the invention are alpha-olefin polymers, polyamides, polyesters, polyacetals, acrylonitrile-butadiene-styrene thermoplastics, and lubricants of the petroleum oil type or of the synthetic type.

The compounds useful in the invention are represented by the formulae I, II, III, IV or V, as follows:

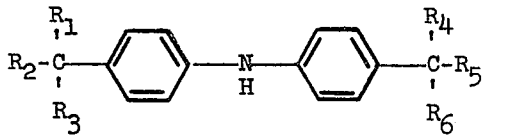

where
$R_1$ is a phenyl or p-tolyl radical
$R_2$ and $R_3$ are methyl, phenyl or p-tolyl radicals,
$R_4$ is a p-tolyl or neophentyl radical,
$R_5$ is a methyl, phenyl, p-tolyl or 2-phenylisobutyl radical,
$R_6$ is a methyl radical;

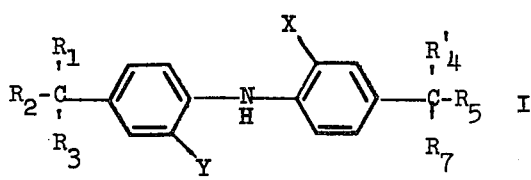

where
$R_1$, $R_2$, $R_3$ and $R_5$ are as defined in formula I,
$R'_4$ is a methyl, phenyl, p-tolyl or neopentyl radical,
$R_7$ is a methyl, phenyl, or p-tolyl radical,
X is a methyl, ethyl, sec-alkyl containing from three to ten carbon atoms, alpha, alpha-dimethylbenzyl, alpha-methylbenzyl, chlorine, bromine, carboxyl or metal carboxylate radical where the metal is zinc, cadmium, nickel, lead, tin, magnesium, or copper, Y is a hydrogen, methyl, ethyl, sec-alkyl containing from three to ten carbon atoms, chlorine, or bromine radical;

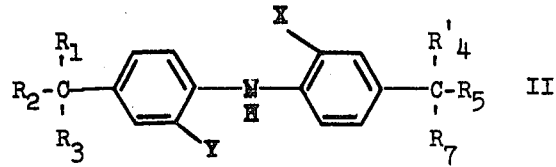

where
$R_1$, $R_2$, $R_3$ and $R_5$ are as defined in formula I,
$R_4$ is a methyl, phenyl, p-tolyl or neopentyl radical,
$R_7$ is a methyl, phenyl, or p-tolyl radical,
X is a methyl, ethyl, sec-alkyl containing from three to ten carbon atoms, alpha, alpha-dimethylbenzyl, alpha-methylbenzyl, chlorine, bromine, carboxyl or metal caroxylate radical where the metal is zinc, cadmium, nickel, lead, tin, magnesium, or copper, Y is a hydrogen, methyl, ethyl, sec-alkyl containing from three to ten carbon atoms, chlorine, or bromine radical;

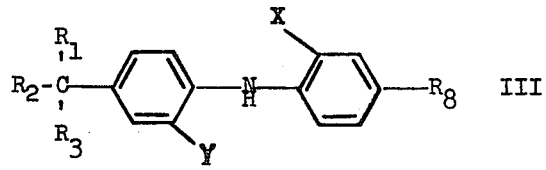

where
$R_1$ is a phenyl or p-tolyl radical,
$R_2$ and $R_3$ are methyl, phenyl or p-tolyl radicals,
$R_8$ is a hydrogen, primary, secondary or tertiary alkyl containing from one to ten carbon atoms, or alkoxyl radical containing from one to ten carbon atoms which may be straight chain or branched, X and Y are hydrogen, methyl, ethyl, sec-alkyl containing from three to ten carbon atoms, chlorine or bromine radicals;

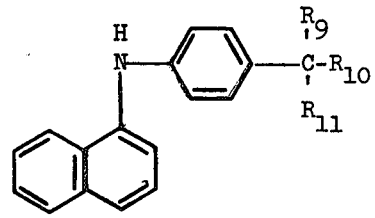

where
$R_9$ is a phenyl or p-tolyl radical,
$R_{10}$ is a methyl, phenyl, p-tolyl or 2-phenylisobutyl radical,
$R_{11}$ is a methyl, phenyl or p-tolyl radical; or

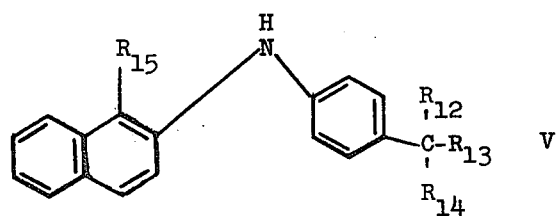

where
R$_{12}$ is a phenyl or p-tolyl radical,
R$_{13}$ is a methyl, phenyl or p-tolyl radical,
R$_{14}$ is a methyl, phenyl, p-tolyl or 2-phenylisobutyl radical,
R$_{15}$ is a hydrogen, alpha, alpha-dimethylbenzyl, alpha-methylbenzhydryl, triphenylmethyl or alpha, alpha, p-trimethylbenzyl radical.

Typical preferred chemicals useful in the invention are as follows:

Type I:

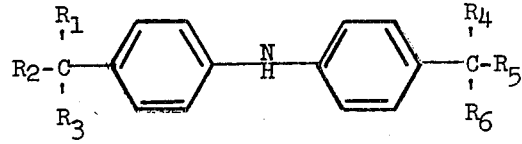

| | R$_1$ | R$_2$ | R$_3$ | R$_4$ | R$_5$ | R$_6$ |
|---|---|---|---|---|---|---|
| (a) | phenyl | phenyl | phenyl | neopentyl | methyl | methyl |
| (b) | p-tolyl | methyl | methyl | p-tolyl | methyl | methyl |

Type II:

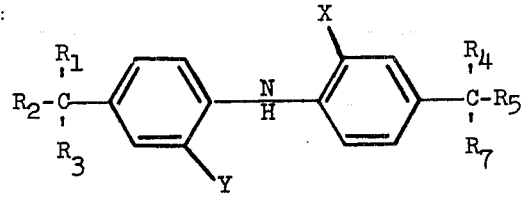

| | R$_1$ | R$_2$ | R$_3$ | R'$_4$ | R$_5$ | R$_7$ | X | Y |
|---|---|---|---|---|---|---|---|---|
| (1) | phenyl | methyl | methyl | phenyl | methyl | methyl | alpha, alpha-dimethylbenzyl | hydrogen |
| (2) | " | " | " | " | " | " | bromo | bromo |
| (3) | " | " | " | " | " | " | carboxyl | hydrogen |
| (4) | " | " | " | " | " | " | nickel carboxylate | " |
| (5) | " | " | " | " | " | " | 2-butyl | " |
| (6) | " | " | " | " | " | " | 2-octyl | " |
| (7) | phenyl | phenyl | phenyl | phenyl | phenyl | phenyl | 2-hexyl | " |

Type III:

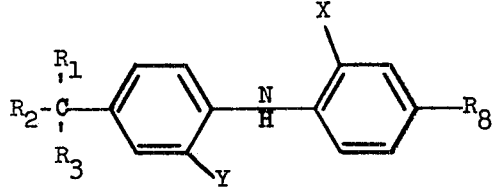

| | R$_1$ | R$_2$ | R$_3$ | R$_8$ | X | Y |
|---|---|---|---|---|---|---|
| (1) | phenyl | methyl | methyl | isopropoxy | hydrogen | hydrogen |
| (2) | phenyl | methyl | methyl | hydrogen | 2-octyl | hydrogen |
| (3) | phenyl | phenyl | phenyl | hydrogen | 2-hexyl | hydrogen |

Type IV:

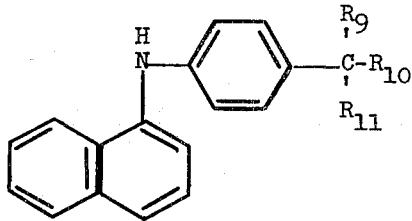

R$_9$ is phenyl and R$_{10}$ and R$_{11}$ are methyl.

Type V:

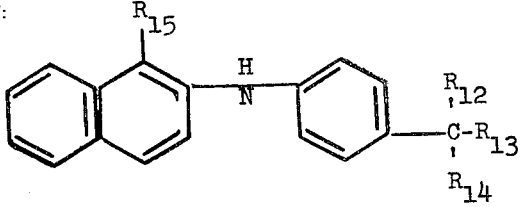

| | R$_{12}$ | R$_{13}$ | R$_{14}$ | R$_{15}$ |
|---|---|---|---|---|
| (1) | phenyl | methyl | methyl | hydrogen |
| (2) | phenyl | methyl | methyl | alpha, alpha-dimethylbenzyl |

It has previously been known to employ 4,4'-bis(1,1,3,3-tetramethylbutyl)diphenylamine as an antioxidant for rubber.

U.S. Pat. No. 2,943,112 to Ivan C. Popoff et al. describes the use of alpha-methylstyrene to reduce the amount of unreacted diphenylamine or monoalkylated diphenylamine present after alkylating the diphenylamine with the C$_5$–C$_{12}$ olefin.

U.S. Pat. No. 2,543,329 to C. S. Myers describes the stabilization of polyethylene with diphenylamine.

U.S. Pat. No. 2,519,755 to M. F. Gribbins describes the use of a dialkyl 3,3'-thiodipropionate as a stabilizer for polyethylene.

U.S. Pat. No. 3,072,603 to C. E. Tholstrup describes the stabilization of poly-alpha-olefins by use of a stabilizer combination consisting of a diester of 3,3'-thiodipropionic acid and a nitrogen-containing compound of the following types:

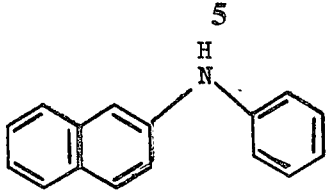

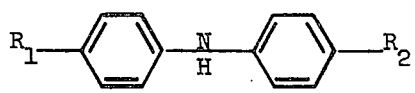

where $R_1$ and $R_2$ are selected from the group consisting of hydrogen atoms and alkyl radicals having 1 to 12 carbon atoms.

The synthesis of 4-trityldiphenylamine and 4,4'-ditrityldiphenyl has been reported by D. Craig, J. Am. Chem. Soc. 71, 2250 (1949); G. Baum, W. L. Lehn, and C. Tamborski, J. Org. Chem. 29, 1264 (1964) and also disclosed as a rubber antioxidant by A. W. Campbell U.S. Pat. No. 1,902,115 (Mar. 21, 1933) and U.S. Pat. No. 1,950,079 (Mar. 6, 1934) although the described structure was incorrect.

As indicated previously, the present derivatives of diphenylamine and phenylnaphthylamines are effective antioxidants for materials of low unsaturation. The materials of low unsaturation include essentially saturated polymers, whether resins or rubbers, such as the alpha-olefin polymers including resinous homopolymers of alpha-olefins (e.g., polyethylene, polypropylene) or the rubbery copolymers of two or more different alpha-olefins (e.g., ethylene-propylene rubber, known as "EPM"). Also incuded are resinous or rubbery polymers having a minor amount of unsaturation, such as the alpha-olefin polymers which are rubbery terpolymers of two or more different alpha-olefins with at least one non-conjugated diolefin (e.g., rubbery terpolymers of ethylene, propylene, and dicyclopentadiene, 1,4-hexadiene, methylene norbornene, cyclooctadiene, or the like, known as "EPDM"); these ordinarily contain less than 25% of olefinic unsaturation (i.e., less than 25% by weight of the diolefin). Similarly, the acrylonitrile-butadiene-styrene polymers (called "ABS" thermoplastics) may be employed. These are usually either (1) graft copolymers of styrene and acrylonitrile on a polybutadiene rubber spine or on a butadiene-styrene rubber spine (with or without additional separately prepared styrene-acrylonitrile resin), or (2) physical mixtures of styrene-acrylonitrile resin with butadiene-acrylonitrile rubber. The olefinic unsaturation (i.e., butadiene content) of such ABS compositions is frequently less than 40%. Other polymers useful in the invention include the polyamides (nylon), polyesters (e.g., polyethylene terephthalate or copolymers thereof, notably in the form of fibers or films), acetal resins (polymers or copolymers as described for example in Modern Plastics Encyclopedia, 1966, pages 109–113; see also U.S. Pat. No. 3,027,352). The present chemicals are useful also as antioxidants for lubricants, whether essentially natural lubricating oil obtained from petroleum, or synthetic lubricants of the type represented by such ester lubricants as alkyl esters of dicarboxylic acids (for example those in which the alkyl group has 6–18 carbon atoms and the dicarboxylic acid has 6–18 carbon atoms) or fatty acid (e.g., $C_8$–$C_{14}$ acids) esters of polyols such as neopentyl glycol, trimethylol propane, pentaerythritol, or the like (see "Synthetic Lubricants" by Gunderson et al., Reinhold, 1962).

The present antioxidants are effective in the conventional amounts ordinarily used for protecting substrates from oxidation, usually within the range of from 0.01% to 4% by weight, based on the weight of the substrate.

The presently employed derivatives of diphenylamine and the phenylnaphthylamines are more effective than the parent compounds or the known 4,4'-dialkyldiphenylamines either alone, in combinations, or in combination with dialkyl 3,3'-thiodipropionates (in which the alkyl groups typically contain from 8 to 20 carbon atoms). The relative proportions of the present chemicals and the dialkyl 3,3'-thiodipropionate are not critical and may be in accordance with conventional practice, usually from 0.01% to 4% of the antioxidant chemical and from 4% to 0.01% of the dialkyl 3,3'-thiodipropionate.

The derivatives of the phenylnaphthylamines are discoloring but are effective high temperature antioxidants, and in synthetic lubricants of the ester type produce less sludge than the parent compounds.

The diphenylamine derivatives are less discoloring than those of prior art and suprisingly in the presence of dialkyl 3,3'-thiodipropionates show no discoloration after thermal aging.

The compounds of the invention such as shown in Formula I may be prepared by alkylating the appropriate diphenylamine or phenylnaphthylamine with the appropriate olefin using a suitable acid catalyst such as aluminum chloride, zinc chloride, or acid clay. Where there are two groups of different structure on the diphenylamine nucleus a stepwise alkylation may be carried out. In the compounds which contained a trityl group, triphenyl-methyl chloride may be used as the alkylating agent.

The unsymmetrical diphenylamines may be prepared in two ways:

a. by condensing an appropriately substituted aniline with o-chlorobenzoic acid. The carboxyl group may be removed, when desired, by thermal decarboxylation. The final unsymmetrical product may be obtained by reacting with the appropriate alkylating agent using an acid catalyst.

b. by alkylating diphenylamine with a vinyl type olefin (i.e., butene-1, octene-1) and separating the predominant 2-alkyl-diphenylamine or 2,2'-dialkyldiphenylamine. This product may then be reacted with the appropriate alkylating agent using a typical acid catalyst to obtain the final product.

Since vinyl type olefins such as butene-1 alkylate preferentially in the ortho position of diphenylamine and vinylidene type olefins such as alpha-methylstyrene and 2,4,4-trimethylpentene-1 alkylate preferentially in the para position of diphenylamine, some of the described compounds can be prepared in one step by alkylating with mixtures of olefins, or by sequential alkylation using first one olefin then the other, without isolation of the intermediate.

Although the alkylation reactions occur primarily as described, in any preparation mixtures of ortho and para isomers as well as mono, di and tri alkylated products occur. Furthermore in alkylations such as the reaction of diphenylamine with octene-1 some isomerization of the olefin occurs giving some 2-(alpha-ethylhexyl)diphenylamine as well as the predominant 2-(alphamethylheptyl)diphenylamine. Since these isomers are difficult to separate, it is a preferred embodiment of the invention to use the reaction mixtures containing primary product and small amounts of the isomeric materials in preparing the antioxidants of the invention.

EXAMPLE I

The preparation of 4-(1,1,3,3-tetramethylbutyl)-4'-triphenylmethyldiphenylamine.

A mixture of 169 g. of diphenylamine and 30 g. of anhydrous aluminum chloride was heated to 90°C. with stirring. 112 g. of diisobutylene was added dropwise over a one hour period. An exotherm occurred and the temperature was maintained at 115°C. during the addition. The mixture was heated at 125–135°C. for an additional hour, then cooled and poured into water. 400 ml. of benzene was added and the organic layer was separated, washed and dried. The benzene was removed by distillation and the residue product was fractionally distilled under reduced pressure. The fraction boiling at 160°–175°C. (0.5mm) was the 4-(1,1,3,3-tetramethylbutyl)diphenylamine.

A mixture of 28.1 g. of 4-(1,1,3,3-tetramethylbutyl)diphenylamine, 27.9 g. of triphenylmethyl chloride, 500 ml. of acetic acid and 50 ml. of concentrated hydrochloric acid was heated under reflux. 25 ml. of acetic acid-water mixture was removed by distillation during the first hour, then the mixture was refluxed an additional 2½ hours. The reaction mixture was poured into water and the resulting solid was removed by filtration. The solid was slurried with benzene and heated under reflux, then filtered hot to remove any insoluble material. The filtrate was evaporated to dryness and the crude product (27 g.) recrystallized three times from hexane m.p. 203°–205°C.

Analysis — Calculated for $C_{39}H_{41}N$: C, 89.5; H, 7.84; N, 2.68. Found: C, 89.7; H, 7.86; N, 2.85.

EXAMPLE II

The preparation of 4,4'-bis(alpha, alpha, p-trimethylbenzyl)diphenylamine.

A mixture of 169 g. of diphenylamine, 25 g. of Montmorillonite clay (Girdler Catalysts' designation KSF/O) previously dried at 120°C. for 16 hours, and 150 ml. of toluene was heated with stirring to 130°C. 220 g. of p,alpha-dimethylstyrene was added over a 1 hour period and the reaction was maintained at 135°C. for 4 hours. The catalyst was removed by filtration and the product was crystallized from hexane, m.p. 102°–103°C.

Analysis — Calculated for $C_{32}H_{35}N$: C,88.7; H, 8.08; N, 3.23. Found: C, 88.6; H, 7.89; N, 3.21.

EXAMPLE III

The preparation of 2,4,4'-tris(alpha-dimethylbenzyl)diphenylamine.

A mixture of 85 g. of diphenylamine, 13.3 g. of anhydrous aluminum chloride, and 200 ml. of n-hexane was heated at the reflux temperature with stirring. 206 g. of alpha-methyl styrene was added dropwise during 1½ hours, and the mixture was stirred at 80°–85°C. for 4½ hours. The reaction mixture was cooled and poured into water, the organic layer separated and washed three times with water, and the solvent was removed by distillation. The product was vacuum topped to 200°C (0.5 mm.). Crystallization of the crude product (216g.) from hexane removed most of the more insoluble 4,4'-bis(alpha,alpha-dimethylbenzyl)diphenylamine. The filtrate was evaporated to dryness and the residue product (145 g.) recrystallized twice from isopropanol to obtain 49g., m.p. 114°–116°C. An analytical sample was prepared by chromatographing 10 g. of the compound on 250 g. of alumina using 20% benzene-80hexane as the eluent. The first fractions obtained were evaporated and recrystallized twice from hexane, m.p. 121.5°–122.5°C.

Analysis — Calculated for $C_{39}H_{41}N$: C, 89.5; H, 7.84; N, 2.68; Mol Wt. 523. Found: C, 89.5; H, 7.86; N, 2.63; Mol Wt. 531.

EXAMPLE IV

The preparation of 2,2'-dibromo-4,4'-bis(alpha, alpha-dimethylbenzyl)diphenylamine.

To a stirred solution of 40 g. of 4,4'-bis(alpha, alpha-dimethylbenzyl)diphenylamine in 300 ml. of glacial acetic acid was added 32 g. of bromine dissolved in 100 ml. of glacial acetic acid at room temperature. After the addition was complete the mixture was heated at 45°C for 10 minutes and the product was removed by filtration. The crude dibromo derivative was dissolved in benzene and the solution extracted with dilute sodium hydroxide, then washed with water. The benzene was evaporated and the product was recrystallized from isopropanol to obtain 39 g., m.p. 166°–167°C.

Analysis — Calculated for $C_{30}H_{29}Br_2N$; C, 63.9; H, 5.15; N, 2.49; Br, 28.4. Found: C, 63.5; H, 5.20; N, 2.77; Br, 28.1.

EXAMPLE V

The preparation of 4,4'-bis(alpha,alpha-dimethylbenzyl)-2-carboxydiphenylamine.

187 g. of N-phenylanthranilic acid, prepared according to Org. Syn. Coll. Vol. II p. 15, was dissolved in 500 ml. of a solution containing 50 g. of potassium hydroxide. The insoluble material was removed by filtration. To the aqueous solution was added an aqueous solution containing 71 g. of zinc sulfate. The zinc N-phenylanthranilate was separated by filtration and dried.

A mixture of 110 g. of zinc N-phenylathranilate, 30 g. of zinc chloride and 500 ml. of 1,2-dichloroethane was heated under reflux with stirring. 118 g. of alphamethyl styrene was added dropwise over a twenty minute period and the mixture heated under reflux for 6 hours. The reaction mixture was poured into water and chloroform added. The organic layer was separated and washed with dilute hydrochloric acid, then with water. The solvent was removed by distillation and the product recrystallized from isopropanol to obtain 88 g. of product, m.p. 197°–199°C. Further recrystallization gave material which melted 198°–199°C.

Analysis — Calculated for $C_{31}H_{31}NO$: C, 82.9; H, 6.90; H, 3.12. Found: C, 83.0; H, 7.22; N, 3.32.

EXAMPLE VI

The preparation of nickel 4,4'-bis(alpha,alpha-dimethylbenzyl)diphenylamine-2-carboxylate.

4.5 g. of 4,4'-bis(alpha,alpha-dimethylbenzyl)-2-carboxydiphenylamine was dissolved in 100 ml. of 0.01N sodium hydroxide. 30 ml. of ethanol was added to aid solution and the solution was filtered to remove any undissolved material. 1.44 g. of nickel sulfate dissolved in 50 ml. of water was added to this solution with stirring and the resulting precipitated nickel salt was filtered and dried at 50°C.

EXAMPLE VII

The preparation of 2-sec-butyl-4,4'-bis(alpha,alpha-dimethylbenzyl)-diphenylamine.

A mixture of 169 g. of diphenylamine, 73 g. of butene-1 and 25 g. of Montmorillonite clay (Girdler Catalysts' designation KSF/O) was heated for 5 hours at 175°C. in a one liter stirred autoclave. The catalyst was removed by filtration and the residue combined with a second reaction mixture obtained under similar reaction conditions. The crude mixture was purified by fractional distillation under reduced pressure. The fraction boiling at 136°–137°C. (1.4 mm) was 2-sec-butyldiphenylamine.

A mixture of 66 g. of 2-sec-butyldiphenylamine, 10 g. of Montmorillonite clay (Girder Catalysts' KSF/O), and 30 ml. of toluene was heated with stirring to 130°C. 76.5 g. of alpha-methylstyrene was added over a ½ hour period and the reaction temperature was maintained at 130°–135°C. for 5 hours. The catalyst was removed by filtration, and the solvent was removed by distillation. The viscous residue product was fractionally distilled under reduced pressure. The fraction boiling at 240°C. (0.25mm) was the 2-sec-butyl-4,4'-bis(alpha,alpha-dimethylbenzyl)diphenylamine.

Analysis — Calculated for $C_{34}H_{39}N$: C, 88.5; H, 8.46; N, 3.04. Found: C, 88.6; H, 8.28; N, 2.87.

EXAMPLE VIII

The preparation of 4,4'-bis(alpha,alpha-dimethylbenzyl)-2-(alpha-methylheptyl)diphenylamine.

A mixture of 592 g. of diphenylamine, 471 g. of octene-1 and 59 g. of Montmorillonite clay (Girdler Catalysts' designation KSF/O), previously dried at 120°C. for 3 hours, was heated at 175°C. for 6 hours in a 2-liter Magne-Dash autoclave. The catalyst was removed by filtration and the crude product subjected to fractional distillation. The fraction boiling at 150°–170°C (0.2 mm) weighed 395 g. and assayed 85% 2-(alpha-methylheptyl)diphenylamine.

A mixture of 56 g. of 2-(alpha-methylheptyl)diphenylamine, 8.5 g. of Montmorillonite clay (Girdler Catalysts' designation KSF/O), previously dried at 120°C. for 16 hours, and 50 ml. of toluene was heated to 130°C with stirring. 52 g. of alpha-methylstyrene was added during a twenty minute period and the stirred mixture was maintained at 130°C. for four hours. The catalyst was removed by filtration and the crude product was fractionally distilled under reduced pressure. The fraction distilling at 280°C. (0.5 mm) was the desired product.

Analysis — Calculated for $C_{38}H_{47}N$: C, 88.2; H, 9.09; N, 2.71. Found: C, 88.2; H, 9.05; N, 3.00.

EXAMPLE IX

The preparation of 2-(alpha-methylpentyl)-4,4'-ditrityldiphenylamine.

A mixture of 25.3 g. of 2-(alpha-methylpentyl)-diphenylamine, 58.5 g. of trityl chloride, 2.5 g. of aluminum chloride and 50 ml. of benzene was heated under reflux for 3½ hours. 10 ml. of ethyl ether was added after cooling and the mixture was then poured into water. The aqueous layer was removed and the organic layer was poured into an equal volume of hexane. The resulting precipitate 78 g. was filtered. A pure sample was obtained by chromatography on alumina using benzene as the eluent followed by recrystallization from a 1:1 benzene-isopropanol mixture. The sample was dried under vacuum at 78°C for 8 hours, m.p. 220.5°–221.5°C.

Analysis — Calculated for $C_{56}H_{51}N$: C, 91.2; H, 6.92, N, 1.90. Found: C, 91.3; H, 7.38; N, 1.73.

EXAMPLE X

The preparation of 4-(alpha,alpha-dimethylbenzyl)-4'-isopropoxydiphenylamine.

A mixture of 56.8 g. of isopropoxydiphenylamine, 5 g. of anhydrous aluminum chloride and 100 ml. of n-hexane was heated at the reflux temperature with stirring. 30.7 g. of alpha-methylstyrene was added dropwise and after the addition was completed the mixture was heated an additional four hours at 70°–75°C. The reaction mixture was poured into water and benzene was added to facilitate separation. The benzene layer was washed with dilute sodium hydroxide, then water, and dried over sodium sulfate. The benzene was removed by distillation and the crude product was fractionally distilled. 51 g. of product was obtained: b.p. 211°–216°C. (0.3 mm).

Analysis — Calculated for $C_{24}H_{27}NO$: C, 83.4; H, 7.88; N, 4.05. Found: C, 83.1; H, 8.35; N, 4.08.

EXAMPLE XI

The preparation of 2-(alpha-methylheptyl)-4'-(alpha,alpha-dimethylbenzyl)diphenylamine.

A mixture of 39.5 g. of 2-(alpha-methylheptyl)-diphenylamine and 6 g. of Montmorillonite clay (Girdler Catalysts' designation KSF/O) was heated to 125°C. and 20 g. of alpha-methylstyrene was added over a ten minute period. The mixture was heated at 120°–130°C. for four hours. The reaction mixture was diluted with benzene and the catalyst was removed by filtration. The solvent was removed by distillation and the residue product was purified by fractional distillation under reduced pressure. The fraction boiling at 220°C (0.4 mm) was the desired product.

Analysis — Calculated for $C_{39}H_{37}N$: C, 87.2; H, 9.27; N, 3.51. Found: C, 87.1; H, 9.22; N, 3.82.

EXAMPLE XII

The preparation of 2-(alpha-methylpentyl)-4'-trityl-diphenylamine.

A mixture of 846 g. of diphenylamine, 547 g. of hexene-1 and 85 g. of Montmorillonite clay (Girdler Catalysts' designation KSF/O) was heated in a one gallon stirred autoclave for 6 hours at 225°C. The reaction mixture was diluted with toluene and the catalyst removed by filtration. The solvent and excess hexene-1 were removed by distillation and the crude product was purified by fractional distillation through a 10 inch column packed with Berl saddles. The fraction boiling at 117°–121°C. (0.1 mm) was 2-(alpha-methylpentyl)-diphenylamine.

A mixture of 50.6 g. of 2-(alpha-methylpentyl)diphenylamine, 27.9 g. of trityl chloride, 5 g. of anhydrous aluminum chloride and 150 ml. of benzene was heated at the reflux temperature for three hours. The reaction mixture was poured into water and the organic layer separated and washed four times with water. The solvent was removed by distillation and the unreacted starting material removed by distillation under reduced pressure, b.p. 123°C. (0.3 mm). The residue product was chromatographed on alumina using 20% benzene-80% hexane as the eluent. The product thus obtained was recrystallized twice from hexane to obtain the desired product: m.p. 67°–71°C.

Analysis — Calculated for $C_{37}H_{37}N$: C, 89.7; H, 7.48; N, 2.83. Found: C, 89.8; H, 7.40; N, 3.07.

EXAMPLE XIII

The preparation of N-(4-alpha,alpha-dimethyl-benzylphenyl)-1-naphthylamine.

A mixture of 219 g. of N-phenyl-1-naphthylamine, 25 g. of Montmorillonite clay (Girdler Catalysts' designation KSF/O) and 300 ml. of toluene was heated to the reflux temperature and 100 ml. of toluene was distilled from the mixture. The reaction mixture was maintained at 130°C. and 260 g. of alpha-methylstyrene was added dropwise over a one hour period. The mixture was heated an additional four hours at 135°C. The catalyst was removed by filtration and the product vacuum topped to 200°C. (1.0 mm). The crude product was purified by chromatography on alumina using benzene-hexane mixtures as the eluent, followed by two recrystallizations from hexane. The pure product after drying under vacuum at 78°C. for six hours melted at 91.5°–92.5°C.

Analysis — Calculated for $C_{25}H_{23}N$: C, 89.0; H, 6.87, N, 4.15. Found: C, 89.0; H, 7.06; N, 4.04

EXAMPLE XIV

The preparation of N-(4-alpha,alpha-dimethyl-benzylphenyl)-1-(alpha,alpha-dimethylbenzyl)-2-naphthylamine.

A mixture of 219 g. of N-phenyl-2-naphthylamine, 30 g. of anhydrous aluminum chloride, and 250 ml. of benzene was heated with stirring to 70°–75°C. 260 g. of alpha-methylstyrene was added dropwise during a one hour period and the reaction mixture was maintained at 70°–85°C. for 4 hours. The mixture was poured into water, more benzene was added and the benzene solution was washed twice with water. The benzene was removed by distillation and the crude product vacuum topped at 200°C. (0.4 mm). 394 g. of residue product was obtained. A pure product (m.p. 121.5°–122.0°C.) was obtained by two recrystallizations from a benzene-hexane mixute.

Analysis — Calculated for $C_{34}H_{33}N$: C, 89.6; H, 7.30; N, 3.08; Mol. Wt. 456. Found: C, 89.8; H, 7.49; N, 3.12; Mol Wt. 471.

EXAMPLE XV

The preparation of N-(4-alpha,alpha-dimethylbenzylphenyl)-2-naphthylamine.

A mixture of 110 g. of N-phenyl-2-naphthylamine, 12.5 g. of Montmorillonite clay (Girdler Catalysts' designation KSF/O) and 150 ml. of toluene was heated at the reflux temperature with stirring. Water was removed from the catalyst by azeotropic distillation along with 100 ml. of toluene. 65 g. of alpha-methylstyrene was added dropwise over a ½ hour period and the reaction mixture was maintained at 100°C. for 2 hours. The catalyst was removed by filtration and the solvent removed by distillation. The product was crystallized from hexane and after two recrystallizations from hexane melted at 92.0°–92.5°C.

Analysis — Calculated for $C_{25}H_{23}N$: C, 89.0; H, 6.87; N, 4.15. Found: C, 88.6; H, 7.07; N, 3.85.

EXAMPLE XVI

In this example the compounds of the invention were tested as stabilizers for polyacetal resins against thermal degradation.

The solid stabilizers were incorporated into unstabilized acetal copolymer resin based on trioxane ("Celcon CKX-205", see Modern Plastics Encyclopedia, 1966, page 111, or U.S. Pat. No. 3,027,352), by dry blending for five minutes using a Waring Blender. Liquid stabilizers were incorporated by dissolving in a suitable solvent, slurrying with the resin and steaming under vacuum to remove the solvent. Five grams of the powdered resin containing 0.5% by weight of the stabilizer was placed in an open aluminum cup and exposed in a 230°C. oven for 45 minutes, and the loss in weight of the polymer was determined.

Table I

| Compound | % Weight Loss |
|---|---|
| Control | 31.9 |
| 4-(1,1,3,3-tetramethylbutyl)-4'-triphenylmethyldiphenylamine | 0.84 |
| N-(4-alpha,alpha-dimethylbenzylphenyl)-2-naphthylamine | 0.74 |
| N-(4-alpha,alpha-dimethylbenzylphenyl)-1-naphthylamine | 0.86 |
| 4,4'-butylidene bis(6-tert.-butyl-metacresol) ("Santowhite Powder") | 2.24 |

EXAMPLE XVII

This example demonstrates the usefulness of the compounds of the invention as processing stabilizers for terpolymers composed of ethylene, propylene, and a small amount of a non-conjugated diene.

Two per cent by weight of the stabilizer was incorporated into unstabilized rubbery terpolymer, containing for example about 62% ethylene, 33% propylene and 5% dicyclopentadiene, on a mill at 150°F. and the mixture subjected to milling at 300°F. After various milling times the Mooney viscosity (ML-4 at 212°F.) of the polymer was measured. A rise in viscosity is indicative of degenerative cross-linking of the polymer due to heat and mechanical shearing.

Table II

| Compound | Mooney Viscosity vs Time on 300°F. Mill | | | | |
|---|---|---|---|---|---|
| | 0" | 15" | 30" | 45" | 60" |
| Control | 53 | 57 | 74 | 90 | 97 |
| 2,2'-dibromo-4,4'-bis(alpha,alpha-dimethylbenzyl)diphenylamine | 53 | 52.5 | 51 | 50.5 | 54 |
| 2,4,4'-tris(alpha,alpha-dimethylbenzyl)diphenylamine | 54 | 51 | 49.5 | 49 | 50 |
| N-(4-alpha,alpha-dimethylbenzylphenyl)-1-naphtylamine | 52 | 51.5 | 52 | 52 | 53 |

EXAMPLE XVIII

This example demonstrates the usefulness of the compounds of the invention as stabilizers for synthetic lubricants of the ester type.

To 300 ml. of a synthetic lubricant, namely, di(2-ethylhexyl)sebacate ("Plexol 201-J"), is added 5.40 g. (2% by weight) of the antioxidant. The mixture is warmed and agitated to facilitate solution. When a homogeneous solution is obtained a 15 ml. sample is withdrawn and the neutralization value (ASTM D974-58T) is determined. The Saybolt viscosity is determined on a standard Saybolt viscometer. A 250 ml. sample is placed in a 750 ml. test tube with an open end formed as a ground glass joint. A copper washer and iron washer are polished with fine emery cloth, washed with acetone and placed on an air delivery tube having a lip to support the washers 6 mm from the lower end of the tube which is beveled to allow free air flow. The air tube and washers are inserted in the test tube containing the oil sample to which an Allihn type ground glass joint condenser is connected. The assembly is placed in the well of an aluminum heating block maintained at 400°F. The flow of cooling water is started through the condenser and a source of clean dry air is connected to the air tube and allowed to flow uniterrupted for 72 hours at a rate of 12.5 liters/hour.

At the end of 72 hours the oil is allowed to come to room temperature and the oil loss determined. The oil sample is filtered, and the Saybolt viscosity, neutralization value (ASTM D 974-58T) and the amount of sludge are determined.

The stabilizers (0.1% by weight) were milled into unstabilized polyethylene ("DYNH") at 310°F. for 5–7 minutes. The polymer was then extruded into plates, 75 millimeters thick. The plates were aged at 375°F. and the time to resinification determined.

Table IV

| | Compound | Minutes to Resinification (375°F.) |
|---|---|---|
| (1) | Control (unstabilized) | 120 |
| (2) | 4-(1,1,3,3-tetramethylbutyl)-4'-triphenylmethyldiphenylamine | 150 |
| (3) | 2,4,4'-tris(alpha,alpha-dimethylbenzyl)diphenylamine | 180 |

EXAMPLE XX

This example demonstrates the usefulness of the compounds of the invention as stabilizers for polypropylene in combination with dilauryl thiodipropionate. The stabilizers were incorporated into the polypropylene (unstabilized "Profax 6501") by first milling the resin at 340°F. for several minutes, then adding the stabilizers to the polymer. The milling was continued for 8–10 minutes. The polymer was then molded into plates 90 millimeters thick. Three plates of each sample of stabilized polymer were aged at 300°F. in a circulating air oven. The break point was defined as the first sign of embrittlement or crumbling in two out of the three pieces.

Table V illustrates the synergism obtained with di-

Table III

| | | Viscosity at 210°F. Saybolt Universal Seconds | | Neutralization Number | | Oil Loss after | |
|---|---|---|---|---|---|---|---|
| | | 0 Hours | 72 Hours | 0 Hours | 72 Hours | 72 Hours | Sludge |
| (1) | 4-(1,1,3,3-tetramethylbutyl)-4'-trityldiphenylamine | 38 | 40.6 | 0.22 | 17.2 | 3.5 | light |
| (2) | 2-(alpha-methylheptyl)-4,4'-bis(alpha,alpha-dimethylbenzyl)diphenylamine | 38 | 41.0 | 0 | 23.3 | 3.5 | light |
| (3) | 2-(alpha-methylheptyl)-4'-(alpha,alpha-dimethylbenzyl)diphenylamine | 38 | 39.5 | 0.16 | 22.6 | 6.9 | light |
| (4) | N-(4-alpha,alpha-dimethylbenzylphenyl)-1-naphthylamine | 38 | 39.6 | 0.44 | 12.5 | 6.1 | medium |
| (5) | N-(4-alpha,alpha-dimethylbenzylphenyl)-2-naphthylamine | 38 | 39.8 | 0.49 | 16.2 | 5.2 | heavy |
| (6) | N-(4-alpha,alpha-dimethylbenzylphenyl)-1-alpha,alpha-dimethylbenzyl)-2-naphthylamine | 38 | 39.8 | 0.29 | 14.0 | 5.2 | heavy |
| | Control | 38 | 43.2 | 0.25 | 32.2 | 5.2 | trace |

EXAMPLE XIX

This example demonstrates the usefulness of the compounds of the invention as stabilizers for polyethylene.

phenylamine derivatives of the invention with dilauryl 3,3'-thiodipropionate both in stabilization and color and indicates their superiority over chemicals of prior art.

Table V

| | Compound | (conc.) | Days to Break at 300°F. | Initial Color | Color at Break |
|---|---|---|---|---|---|
| (1) | 4,4'-bis(1,1,3,3-tetramethylbutyl)diphenylamine* | (0.3%) | 2 | white | yellow |
| (2) | dilauryl 3,3'-thiodipropionate | (0.4%) | 10 | white | white |
| (3) | 4,4'-bis(1,1,3,3-tetramethylbutyl)diphenylamine dilauryl 3,3'-thiodipropionate* | (0.1%) (0.4%) | 20 | white | white |
| (4) | 2,4,4'-tris(alpha,alpha-dimethylbenzyl)diphenylamine dilauryl 3,3'-thiodipropionate | (0.1%) (0.4%) | 30 | white | white |
| (5) | 4-(1,1,3,3-tetramethylbutyl)-4'-trityldiphenylamine dilauryl 3,3'-thiodipropionate | (0.1%) (0.4%) | 48 | white | yellow |
| (6) | nickel 4,4'-bis(alpha,alpha-dimethylbenzyl)diphenylamine-2-carboxylate dilauryl 3,3'-thiodipropionate | (0.1%) (0.4%) | 62 | off-white | off-white |

*Prior Art

Table VI is a further illustration of the synergism between the diphenylamine derivatives of the invention and dilauryl 3,3'-thiodipropionate.

Table VI

| | Compound | (conc.) | Days to Break at 300°F. | Initial Color | Color at Break |
|---|---|---|---|---|---|
| (1) | dilauryl 3,3'-thiodipropionate | (0.4%) | 20 | white | off-white |
| (2) | 2,4,4'-tris(alpha,alpha-dimethylbenzyl)diphenylamine | (0.1%) | 41 | white | white |
| | dilauryl 3,3'-thiodipropionate | (0.4%) | | | |
| (3) | 4,4'-bis(alpha,alpha-dimethylbenzyl)-2-carboxydiphenylamine | (0.1%) | 41 | yellow | yellow |
| | dilauryl 3,3'-thiodipropionate | (0.4%) | | | |
| (4) | 4-(alpha,alpha-dimethylbenzyl)-4'-isopropoxydiphenylamine | (0.1%) | 31 | orange | white |
| | dilauryl 3,3'-thiodipropionate | (0.4%) | | | |

Table VII illustrates the effectiveness of the phenyl-naphthylamine derivatives of the invention as stabilizers for polypropylene, their synergism with dilauryl 3,3'-thiodipropionate and their superiority over chemicals of prior art.

400°F. in a circulating air oven and the infrared spectrum examined at specified time intervals. The optical density of the 5.85 carbonyl band was plotted against time in minutes. The oxidative life of the polymer containing the antioxidants was defined by a large increase in the slope of the plot. Table VIII illustrates the effectiveness of the chemical combinations when compared to a commercial phenolic system.

Table VII

| | Compound | (conc.) | at 300°F. | Initial Color | Color at Break |
|---|---|---|---|---|---|
| (1) | N-phenyl 1-naphthylamine* | (0.1%) | 1 | white | yellow |
| | " | (0.3%) | 1 | buff | dark yellow |
| (2) | N-phenyl 2-naphthylamine* | (0.1%) | 1 | off-white | yellow |
| | | (0.3%) | 1 | pink | dark yellow |
| (3) | N-(4-alpha,alpha-dimethylbenzylphenyl)-1-naphthylamine | (0.1%) | 2 | white | tan |
| | | (0.3%) | 19 | tan | tan |
| (4) | N-(4-alpha,alpha-dimethylbenzylphenyl)-2-naphthylamine | (0.1%) | 2 | off-white | tan |
| | | (0.3%) | 16 | light pink | tan |
| (5) | N-(4-alpha,alpha-dimethyl benzylphenyl)-1-naphthylamine | (0.1%) | 32 | white | off-white |
| | dilauryl 3,3'-thiodipropionate | (0.4%) | | | |
| (6) | N-phenyl-1-naphthylamine* | (0.1%) | 12 | white | white |
| | dilauryl 3,3'-thiodipropionate | (0.4%) | | | |
| (7) | N-phenyl-2-naphthylamine* | (0.1%) | 16 | off-white | off-white |
| | dilauryl 3,3'-thiodipropionate | (0.4%) | | | |
| (8) | N-(4-alpha,alpha-dimethylbenzylphenyl)-2-naphthylamine | (0.1%) | 24 | white | off-white |
| | dilauryl 3,3'-thiodipropionate | (0.4%) | | | |

*Prior Art

Table VIII

| | Compound | Concentration % by Weight | Oxidative Life at 400°F. (Minutes) |
|---|---|---|---|
| (1) | 2-(alpha-methylheptyl)-4,4'-bis(alpha, alpha-dimethylbenzyl)diphenylamine | (0.5%) | 135 |
| | dilauryl 3,3-thiodipropionate | (0.5%) | |
| (2) | 4-(1,1,3,3-tetramethylbutyl)-4'-trityldiphenylamine | (0.5%) | 150 |
| | dilauryl 3,3'-thiodipropionate | (0.5%) | |
| (3) | methylene bis-(4-methyl-6-nonyl)phenol ("Naugawhite") | (0.25%) | 75 |
| | dilauryl 3,3'-thiodipropionate | (0.70%) | |

EXAMPLE XXI

This example demonstrates the usefulness of the compounds of the invention in combination with dilauryl 3,3'-thiodipropionate as thermal stabilizers for acrylonitrile-butadiene-styrene thermoplastics.

A 91.1% dispersion of a commercial ASB thermoplastic was made with chloroform as the dispersing agent. The ABS used in all studies contains approximately 56.5% styrene, 23.5% acrylonitrile, and 20.0% butadiene prepared by the method of Childers and Fisk, U.S. Pat. No. 2,820,773. Atioxidants were dissolved in chloroform and the proper amount added to the ABS homogeneous dispersion.

Films were prepared on salt plates by evaporation of smears of the dispersions. The films were aged at

I claim:

1. A composition comprising a major amount of a substrate which is a lubricating oil, containing intimate admixture, as an antioxidant, a stabilizing amount of a chemical selected from the group consisting of
   N-(4-alpha, alpha-dimethylbenzylphenyl)-1-naphthylamine,
   N-(4-alpha, alpha-dimethylbenzylphenyl)-2-naphthylamine, and
   N-(4-alpha, alpha-dimethylbenzylphenyl)-1-(alpha, alpha-dimethylbenzyl)-2-naphthylamine.

2. A composition as in claim 1 in which the said chemical is N-(4-alpha,alpha-dimethylbenzylphenyl)-1-naphthylamine.

3. A composition as in claim 1 in which the said chemical is N-(4-alpha,alpha-dimethylbenzylphenyl)-2-naphthylamine.

4. A composition as in claim 1 in which the said chemical is N-(4-alpha, alpha-dimethylbenzylphenyl)-1-(alpha, alpha-dimethylbenzyl)-2-naphthylamine.

* * * * *